United States Patent [19]
Galy et al.

[11] Patent Number: 5,689,632
[45] Date of Patent: Nov. 18, 1997

[54] COMPUTING UNIT HAVING A PLURALITY OF REDUNDANT COMPUTERS

[75] Inventors: Richard Galy, Charenton; Alain Giraud, Orsay, both of France

[73] Assignee: Commissariat a l'Energie Atomique, France

[21] Appl. No.: 736,295

[22] Filed: Oct. 24, 1996

Related U.S. Application Data

[63] Continuation of Ser. No. 490,349, Jun. 14, 1995, abandoned.

[30] Foreign Application Priority Data

Jun. 14, 1994 [FR] France ............................ 94 07251

[51] Int. Cl.$^6$ ....................................... G06F 11/00
[52] U.S. Cl. ........................... 395/182.09; 364/268.3
[58] Field of Search ................. 395/182.09, 182.08, 395/182.11; 364/268, 268.1, 268.3

[56] References Cited

U.S. PATENT DOCUMENTS

| | | | |
|---|---|---|---|
| 3,517,174 | 6/1970 | Ossfeldt | 395/182.09 |
| 3,829,668 | 8/1974 | Noumi et al. | 235/153 |
| 3,875,390 | 4/1975 | Eccles | 395/182.09 |
| 3,898,621 | 8/1975 | Zelinski et al. | 340/172.5 |
| 4,270,168 | 5/1981 | Murphy | 364/200 |
| 5,029,071 | 7/1991 | Kinoshita | 395/182.09 |
| 5,136,704 | 8/1992 | Danielsen et al. | 395/575 |
| 5,138,708 | 8/1992 | Vosbury | 395/182.09 |
| 5,155,729 | 10/1992 | Rysko | 395/182.09 |
| 5,287,361 | 2/1994 | Joffre | 371/8.1 |

FOREIGN PATENT DOCUMENTS

| | | |
|---|---|---|
| 0561519 | 9/1993 | European Pat. Off. |
| 2346772 | 10/1977 | France . |
| 2122393 | 1/1984 | United Kingdom . |

*Primary Examiner*—Robert W. Beausoliel, Jr.
*Assistant Examiner*—Dieu-Minh Le
*Attorney, Agent, or Firm*—Hayes, Soloway, Hennessey, Grossman & Hage, P.C.

[57] ABSTRACT

A computing unit having at least two redundant computers for independently performing identical computing tasks and for each supplying computing data to a comparator, and a multiplexer controlled by the comparator so as to transmit to an output the computing data of at least one of the computers when the comparator detects an agreement with respect to the computing data coming from each computer. The computing unit also has a controller for controlling the operation of each computer, and the multiplexer is adapted to supply to an output the computing data of a computer, whose satisfactory operation is verified by the controller, when the comparator detects a difference between the computing data respectively coming from each computer.

7 Claims, 2 Drawing Sheets

COMPUTING UNIT HAVING A PLURALITY OF REDUNDANT COMPUTERS

This is a continuation of application Ser. No. 08/490,349 filed on Jun. 14, 1995, now abandoned.

BACKGROUND OF THE INVENTION

1. Field of the Invention

The present invention relates to a computing unit having a plurality of redundant computers and in particular a unit having a two-branch structure, known as a duplex structure, with fault or error masking. Such computing units can in particular be used in on-board devices for hostile environments and more particularly irradiated environments. Possible applications occur in the space, military and nuclear fields, but also e.g. in the aero-nautical or railway fields.

2. Brief Description of Related Prior Art

The known computing units can be configured according to several different architecture types. However, a three-branch architecture like that illustrated in FIG. 1 is particularly widely used. The computing unit has three redundant computer modules (TMR) designated by the reference 102. These computers operate in parallel and carry out the same work supplying their results to a voter 103. The voter 103 supplies to an output 106 the data e.g. coming from one of the computers when the results are identical. Due to the odd parity of the computers, it is however possible to make a choice of the data to be sent to the output in the case of divergent results of one of the computers. For example, it is possible to supply the results of two concordant computers only.

A TMR computing unit has a simple design and operates efficiently. A fault of one of the computers due to a disturbance is masked, because the voter then chooses to transmit the results of the two other convergent computers.

However, a computing unit with a three-branch architecture, i.e. with three computers is not always compatible with the requirements of small overall dimensions, low consumption and reduced cost imposed by the envisaged on-board applications.

FIG. 2 shows a computing unit having a two-branch architecture. It only has two redundant computers 102a, 102b connected to a comparator 104 and to a multiplexer 105.

Compared with the three-branch unit, such a unit has the advantage of being economical as regards space consumption and cost due to the reduced number of computers.

The two computers operating in parallel carry out the same work and supply their results to a comparator, which determines whether there is a difference between the two calculations. It then informs thereof the multiplexer not having on its output the result except when there is equivalence between the two calculations, otherwise the multiplexer does not present anything. It is therefore sufficient for one of the computers not to operate correctly to render the computing unit inoperative, so that such a unit would a priori be relatively unavailable a fortiori in a hostile environment.

One object of the invention is to propose a computing unit with a two-branch structure of the duplex type, i.e. with only two computers and able to take decisions and therefore operate in a reliable manner, particularly in a hostile environment, such as e.g. an irradiated environment.

More generally, an object of the invention is to supply a tolerant computing unit having, for a given structure, a minimum number of components and which is particularly suitable for reduced electric power consumption.

Another object is to obtain a simple structure, low manufacturing costs and reduced overall dimensions.

DESCRIPTION OF THE INVENTION

In order to achieve the objectives referred to hereinbefore, the invention more specifically relates to a computing unit having two redundant computers able to independently perform identical computing tasks and in each case supply computing data to a comparator, and a multiplexer controlled by the comparator in order to transmit to an output the computing data of at least one of the computers when the comparator detects an identity of the computing data from each computer, characterized in that the computing unit also has means for controlling and for checking the satisfactory operation of each computer, the multiplexer being able to supply to an output the computing data of a computer, whose satisfactory operation is verified by the control means when the comparator detects a difference in the computing results coming respectively from each computer and in that each computer has a plurality of microcontrollers operating in turn.

The term computing data is understood to mean one or more computing results supplied by each computer to the comparator and the multiplexer.

According to an aspect of the invention, the means for checking or controlling the satisfactory operation have for each computer a so-called "life tester" system and a so-called "consistency tester" system.

The term "life tester" is understood to mean with respect to a computer a system responsible for determining whether said computer is in an operating state. This tester can e.g. be a timer which must be continuously restarted by the computer otherwise the tester will deduce therefrom that the computer is no longer operating.

The "consistency tester" is a system responsible for carrying out an elaborate analysis of the data of each computer. For example, each computer can supply to the tester a word, whose high-order bits are the result of a mathematical transformation of the low-order bits (or vice versa). A simple logic unit then verifies whether the mathematical transformations have been performed by the computer.

A consistency can e.g. consist of making each computer present a data item, whose high-order bits are the complement of the low-order bits.

According to an advantageous aspect of the invention, the consistency test can be performed in several stages at different points in the performance of the program of each computer. For performing the test, the consistency tester can e.g. have a plurality of logic gates.

Thus, in the case of a two-branch structure with two computers and, following the performance of a calculation, each computer supplies a data item to the comparator. If the two data items are identical, the comparator orders the multiplexer to supply one of the two data items on its output.

If the two data items are different, the comparator reads the information supplied to it by each life tester. If a life tester is not e.g. regularly refreshed by its computer, the comparator deduces therefrom that the latter is subject to a breakdown and will consider that the data from the other computer are correct. It then gives the instruction to the multiplexer to present at its output the data from the computer considered to be correct.

If the two data items are different and the two life testers have been refreshed, the comparator will read the informations supplied to it by the consistency testers. If the test of a computer is incoherent, the comparator deduces therefrom that the other computer is correct. It then gives the order to the multiplexer to present its information on its output.

One case can be subject to dispute, namely where the data are different and the tests of the control means are verified. However, if care is taken to program these two tests at clearly different points of the software, there is little chance of these three conditions being combined, the risk of this case occurring being directly dependent on the programming quality of the consistency tester and it can consequently be minimized.

According to an advantageous aspect of the invention, each computer has a plurality of microcontrollers operating in turn.

It has been found that the components of the microcontrollers and more particularly those of the MOS type subject to radiation, but which are dead, can at least partly recover their initial characteristics after being deteriorated when they were live.

According to another feature of the invention, each microcontroller can be associated with a monitoring system able to energize the microcontroller in periodic manner and alternating with the other microcontrollers. The monitoring system can also check the operation of the microcontroller and deenergize it when it has operating deficiencies.

Other features and advantages of the invention can be gathered from the description with respect to the attached drawings.

DETAILED DESCRIPTION OF EMBODIMENTS

Figure 1:
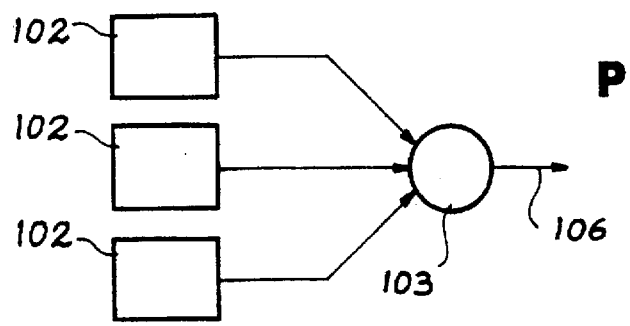
FIG. 1 already described, is a simplified diagrammatic representation of a known computing unit having a three-branch architecture.
Figure 2:
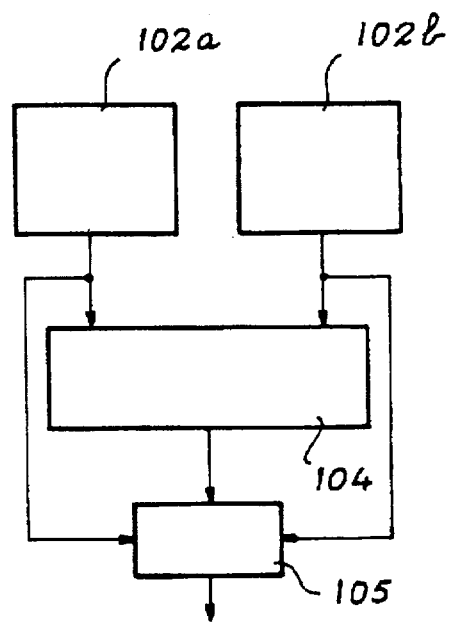
FIG. 2 already described, is a simplified diagrammatic representation of a computing unit having a two-branch architecture.
Figure 3:
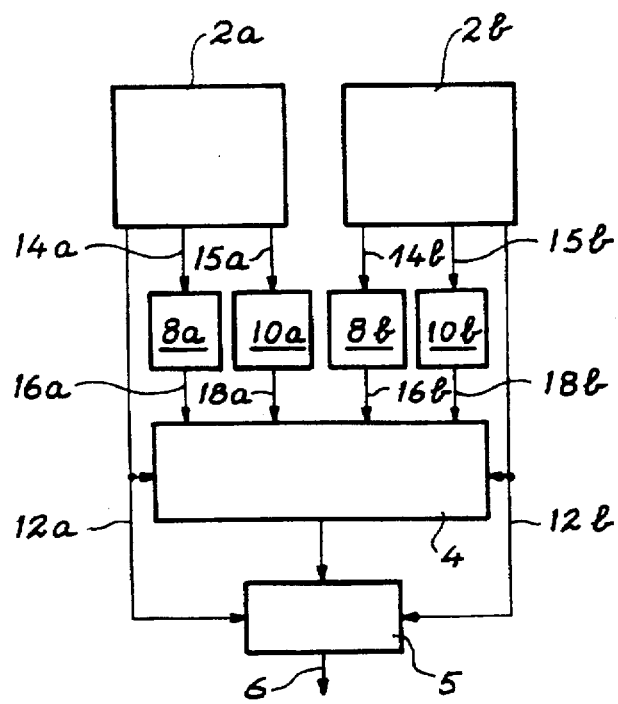
FIG. 3 is a simplified diagrammatic representation of a computing unit with a two-branch architecture according to the invention.

The computing unit of FIG. 3 has two redundant computers $2a$ and $2b$ operating in parallel and performing the same computing tasks. These computers correspond to two branches in the general architecture of the computing unit.

A comparator 4 receives the computing results from the computers $2a$ and $2b$ and controls a multiplexer 5, which transmits to an output 6 the computing result or results of one of the computers when these results are considered to be correct by the comparator.

In order to establish the correctness of the computing results, the comparator performs a comparison of the results of the two computers and checks their coincidence. In this connection, the computers $2a$, $2b$ can optionally operate according to different programs or algorithms in order to improve the relevance of the comparison.

If a coincidence is established then, as described hereinbefore, the results of the two computers are considered to be correct and are transmitted by the multiplexer 5 to the output 6.

If the coincidence of the results is not established, the comparison means have means for checking the satisfactory operation of the computers in order to determine which is liable to supply correct results.

In the example of FIG. 3, said checking or control means have means $8a$, $8b$ known as "life testers" which check the operating state of each computer, as well as means $10a$, $10b$ known as "consistency testers".

For reasons of simplification, for all the redundant elements of the computing unit identical references are used followed by the letters a or b respectively for each computer.

The computers are connected on the one hand to the comparator and to the multiplexer by connections $12a$, $12b$ and on the other to the control means by the connections $14a$, $14b$, $15a$, $15b$. The connections $16a$, $16b$, $18a$, $18b$ respectively connect the "life tester" means and the "consistency tester" means to the comparator.

Figure 4:
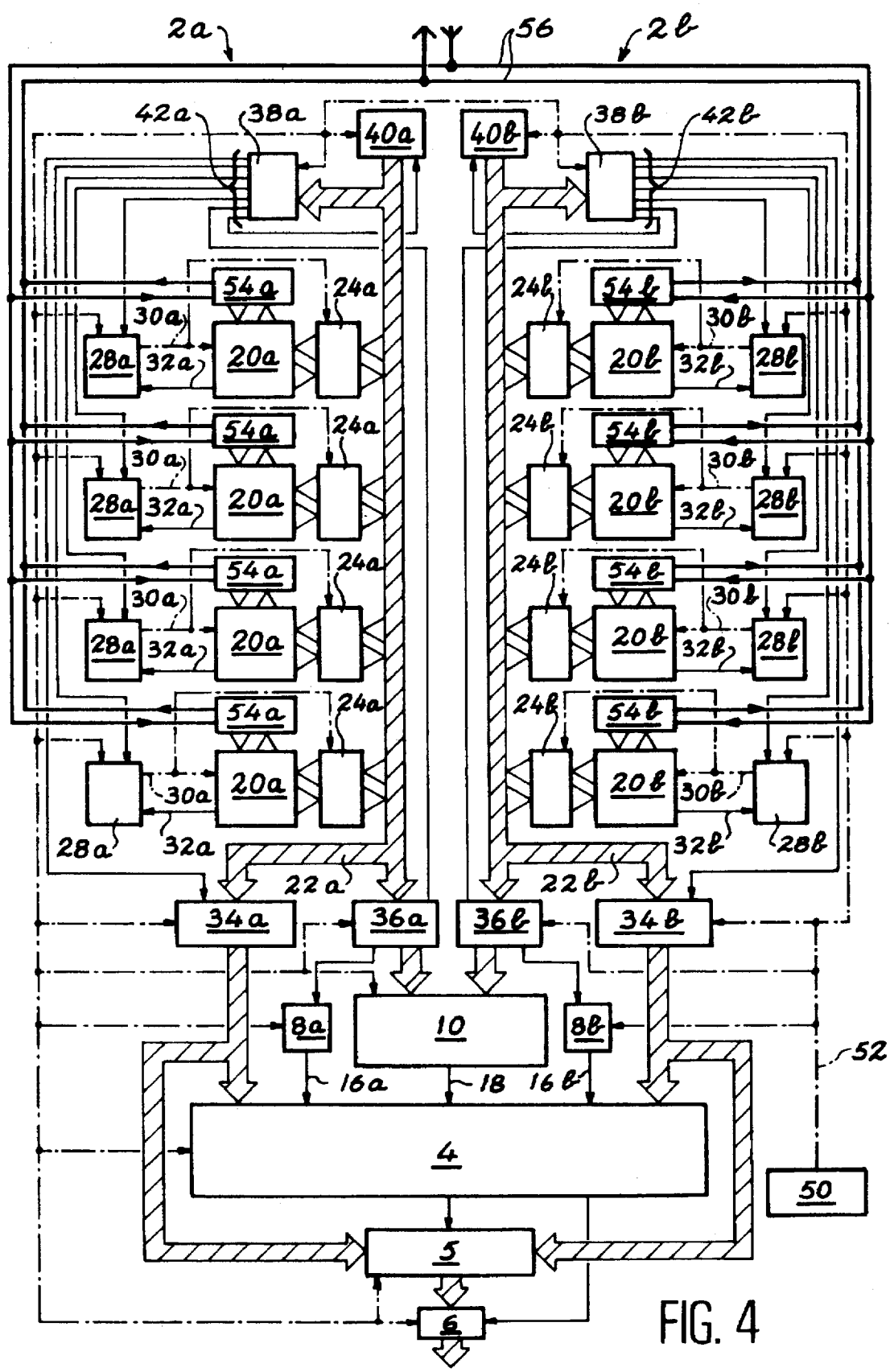
FIG. 4 is a more detailed diagrammatic representation of a computing unit with a two-branch architecture according to the invention.

Thus, FIG. 3 shows the general two-branch architecture for a computing unit according to the invention. FIG. 4, which shows in greater detail different aspects of a particular embodiment of such a computer, has identical references for the elements already described in connection with FIG. 3.

Each computer $2a$, $2b$ has four identical micro-controllers $20a$, $20b$, which operate in turn in order to prolong their operation under irradiation. They are installed in parallel on buses $22a$, $22b$ respectively by interfaces $24a$, $24b$.

Each microcontroller is equipped with a monitoring system $28a$, $28b$ known as a "guard dog". This system is responsible for establishing that the microcontroller is operating. It incorporates a timer which must be started sufficiently frequently by the microcontrollers $20a$, $20b$ to ensure that the guard dog does not deduce therefrom that it is malfunctioning. It is here associated with a switched supply means providing the energy necessary for the operation of the microcontroller. Thus, if the microcontroller fails and no longer refreshes its "guard dog", the latter disconnects the power supply.

The energy switched power supply is shown for each microcontroller by an arrow $30a$ or $30b$. The arrows $32a$, $32b$ represent the refreshing of the timer of the system $28a$, $28b$ to be periodically performed by each microcontroller $20a$, $20b$.

In each computer at least one of the microcontrollers is live and transmits data to the bus $22a$, $22b$ respectively. Said data items are supplied via the bus $22a$, $22b$ respectively to a data register $34a$, $34b$, to a test register $36a$, $36b$ and an address decoding device $38a$, $38b$ known as an address decoder. The address decoder $38a$, $38b$ of each computer $2a$, $2b$ is connected to each register $34a$, $34b$, $36a$, $36b$, as well as to a memory $40a$, $40b$ and to the switched power supplies.

In undetailed manner these connections are represented by groups of arrows $42a$, $42b$ respectively for each computer.

Thus, the address decoder of each computer makes it possible to select each register or the memory of said computer. It also enables each microcontroller to inhibit the operation of any random switched power supply (including its own), so as to be able to operate alone for an instant, if the calculation justifies it. This avoids systematic and useless restarting operations for the other microcontrollers, which give rise to interference. However, this inhibiting time is deliberately physically limited at the time of design in order to prevent a microcontroller which is not operating in a satisfactory manner from deciding to maintain control indefinitely and therefore risking making errors. As a result of the address decoder, the live microcontroller can also choose the microcontroller which will follow it and the time when the latter will start up. Each microcontroller can also self-inhibit.

According to a special embodiment, the microcontroller programs are contained in individual, not shown memories. The common memory 40a40b makes it possible to preserve all important data which the microcontrollers can use in order to know the background of the operations taking place. It is also possible to use said memory 40a, 40b for leaving a plot of the breakdown of a microcontroller, thus enabling the following microcontroller to prevent the re-energizing of the preceding microcontroller.

Thus, the common memory 40a, 40b of each computer 2a, 2b is connected to the corresponding bus 22a, 22b.

The diagram of FIG. 4 also shows the so-called "life tester" means 8a, 8b, which are connected to the test register 36a, 36b of the corresponding computer.

The life tester of each computer is responsible for determining whether the live microcontroller is in an operating state. This tester can be looked upon as a timer which the live microcontroller must continuously start otherwise the tester will deduce therefrom that the microcontroller is no longer operating and therefore that the corresponding computer is not transmitting correct data. This life tester can be looked upon as a guard dog system without a switched supply.

Whereas each computer or each branch of the computing unit has its own life tester 8a, 8b, a single consistency tester 10 is provided for the two computers in the embodiment described. The choice of a single consistency tester is a purely arbitrary choice.

The consistency tester is a system responsible for performing an elaborate analysis of data coming from a live microcontroller of each computer. For example, each microcontroller supplies to the tester a word, whose high-order bits are the result of a mathematical transformation of the low-order bits or vice versa. A simple logic unit then establishes whether the mathematical transformations have indeed been performed by the microcontroller. The more the test is complex and correctly performed, the more it is relevant. Advantageously the test can be programmed at several different points of the software of the microcontrollers, because under irradiation it is possible for certain memory areas to be damaged, whereas others continue to operate.

The data registers 34a, 34b are connected to the comparator 4 and to the multiplexer 5 in order to transmit thereto the results of the calculations. As a function of the controls received from the comparator, the multiplexer transmits the results of one of the computers to an output register 6, which in turn transmits them to not shown actuators. However, if no computer is operational, no new information is transmitted to the actuators.

There is also a general supply 50 connected to the different elements of the computing unit by connecting means 51 shown in mixed line form.

In the case of an on-board computing unit, interfaces 54a, 54b respectively associated with the microcontrollers 20a, 20b, enable the latter to exchange informations with a not shown, central unit by means of a so-called ground communications series line 56.

The computing unit operates as follows. Each active microcontroller of each computer presents a so-called "voting data item" to be verified on its respective bus. These data items are then validated on the data registers 34a and 34b of the comparator 4, which authorizes the multiplexer 5 to present one of its output datas if they are identical.

In the case where the voting data are different, the comparator asks advice from the life testers. It then orders the multiplexer to present the data item of that which has refreshed its life tester.

When the two life testers are refreshed, the comparator then calls on the consistency testers. It then orders the multiplexer to present the data item from that which has correctly performed the test operations of the consistency tester.

If the comparator is unable to remove the doubts, it keeps the preceding data item on the output of the multiplexer for as long as there is no agreement with regards to the data items presented to it.

According to an advantageous aspect of the invention and with each computer able to have a plurality of microcontrollers operating in turn, the comparator awaits the next operating switching in order to remove the doubt and update the data at the output of the multiplexer.

An operation of this type is e.g. illustrated in FR-A-2 663 160 of DEc. 6, 1990 filed by the present applicant.

Each "guard dog" regularly starts its microcontroller. In normal operation, the two active microcontrollers carry out the same work and each inhibits the other switched supplies of its branch, so as to be able to operate without disturbance by the untimely starting operations of the other microcontrollers. When the active microcontroller decides to pass control to another microcontroller, it removes the inhibition of its guard dog and the chosen microcontroller is started up. The latter is then programmed to search for the informations which the microcontroller which has handed over has left in the common memory. The microcontroller which has passed control is disconnected no longer refreshing its guard dog.

If a breakdown leads a microcontroller to permanently take control, sooner or later it will be disconnected by a maximum time lag of its guard dog. The other guard dogs are then no longer inhibited and the first microcontroller which starts will take control (according to a procedure preventing two microcontrollers from taking control at the same time). This first microcontroller will then seek the context in the common memory, respectively 40a, 40b.

Finally, as a result of the invention, a computing unit can be configured according to a two-branch architecture and is able to operate in a hostile environment masking the operating errors of certain components. Therefore the computing unit is more compact and appropriate for a reduced electrical power consumption, its manufacturing costs also being reduced.

The association of the present invention with that forming the subject matter of the aforementioned patent application permits a better resistance to the accumulated dose than an association of the same patent application with a TMR or other architecture for a reduced total number of microcomputers.

Moreover, in other applications where the overall dimensions and power consumption cause no problems, it is obviously possible to configure the computing unit with more than two computers. In this case, each computer connected to the comparator is equipped with means for checking its satisfactory operation in order to improve the reliability of the unit.

I claim:

1. A computing unit having two redundant computers for independently performing identical computing tasks and for each supplying computing data to a comparator, and a multiplexer controlled by the comparator so as to transmit to an output the computing data of at least one of the computers when the comparator detects an agreement of the computing data from each computer, wherein the computing unit also has means for controlling and for checking the satisfactory operation of each computer, comprising, for each life-tester system for establishing whether the computer is in an operating state and a consistency tester system for analyzing the computing data of a given test processing performed by each computer, the multiplexer for supplying to an output the computing data of a computer, whose satisfactory operation is verified by the control and checking means when the comparator detects a difference in the computing results coming respectively from each computer and also wherein each computer has a plurality of microcontrollers operating in turn such that each of said microcontrollers of each of the computers is periodically activated and deactivated, and only one of said microcontrollers is activated during any given time period.

2. A computing unit according to claim 1, wherein each computer has an address decoder for selecting at least one of a register and a memory of the computer.

3. A computing unit according to claim 2, wherein each microcontroller includes a monitoring system for monitoring operation of said microcontrollers, and the address decoder is also connected to each monitoring system of the computer in order to permit inhibition of the operation of at least one monitoring system as a result of an order from at least one of the microcontrollers.

4. A computing unit according to claim 1, wherein each microcontroller has its own memory containing its program.

5. A computing unit according to claim 4, wherein each computer has a memory common to all the microcontrollers in order to preserve important calculations and store background data of the operations taking place.

6. A computing unit according to claim 1, wherein the comparator is also for causing a preceding valid data item to be maintained on the output of the multiplexer for so long as no agreement is detected with regard to computing data presented to said comparator from each computer, and unsatisfactory operation of at least one computer is verified.

7. A computing unit having two redundant computers for independently performing identical computing tasks and for each supplying computing data to a comparator, and a multiplexer controlled by the comparator so as to transmit to an output the computing data of at least one of the computers when the comparator detects an agreement of the computing data from each computer, wherein the computing unit also has means for controlling and for checking the satisfactory operation of each computer, the multiplexer for supplying to an output the computing data of a computer, whose satisfactory operation is verified by the control and checking means when the comparator detects a difference in the computing results coming respectively from each computer and also wherein each computer has a plurality of microcontrollers operating in turn such that each of said microcontrollers is periodically activated and deactivated, and only one of said microcontrollers is activated during any given time period, and also wherein said means for checking satisfactory operation includes for each computer a lifetester system for establishing whether the computer is in an operating state and a consistency tester system for analyzing the computing data of a given test processing performed by each computer and each microcontroller also includes a monitoring system for monitoring operation of said microcontrollers and for disconnecting power supply of any microcontroller when failure of operation is detected.

* * * * *

UNITED STATES PATENT AND TRADEMARK OFFICE
CERTIFICATE OF CORRECTION

PATENT NO. : 5,689,632
DATED : November 18, 1997
INVENTOR(S) : GALY ET AL

It is certified that error appears in the above-indentified patent and that said Letters Patent is hereby corrected as shown below:

Claim 1, Col. 7, line 7, after "each" second occurence insert --computer a--

Signed and Sealed this

Second Day of June, 1998

Attest:

BRUCE LEHMAN

Attesting Officer

Commissioner of Patents and Trademarks